US008406482B1

(12) United States Patent
Chien et al.

(10) Patent No.: US 8,406,482 B1
(45) Date of Patent: Mar. 26, 2013

(54) SYSTEM AND METHOD FOR AUTOMATIC SKIN TONE DETECTION IN IMAGES

(75) Inventors: Jen-Chan Chien, Saratoga, CA (US); Jue Wang, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 978 days.

(21) Appl. No.: 12/200,476

(22) Filed: Aug. 28, 2008

(51) Int. Cl.
*G06K 9/00* (2006.01)
*G06K 9/62* (2006.01)

(52) U.S. Cl. ........ 382/118; 382/115; 382/159; 382/162; 382/165; 382/283

(58) Field of Classification Search ................... 382/118, 382/115, 159, 162, 165, 283
See application file for complete search history.

(56) References Cited

U.S. PATENT DOCUMENTS

| | | | |
|---|---|---|---|
| 6,148,092 A | 11/2000 | Qian | |
| 6,332,033 B1 | 12/2001 | Qian | |
| 6,343,141 B1 | 1/2002 | Okada et al. | |
| 6,690,822 B1* | 2/2004 | Chen et al. | 382/162 |
| 7,218,759 B1* | 5/2007 | Ho et al. | 382/118 |
| 7,844,076 B2* | 11/2010 | Corcoran et al. | 382/103 |
| 2004/0208361 A1* | 10/2004 | Buzuloiu et al. | 382/165 |
| 2005/0175227 A1* | 8/2005 | Paschalakis | 382/128 |
| 2006/0088210 A1* | 4/2006 | Yu et al. | 382/167 |
| 2007/0189627 A1* | 8/2007 | Cohen et al. | 382/254 |
| 2007/0217690 A1 | 9/2007 | Dempski et al. | |
| 2007/0274573 A1* | 11/2007 | Hori | 382/118 |
| 2008/0177185 A1 | 7/2008 | Nakao et al. | |
| 2009/0263013 A1* | 10/2009 | Xiong et al. | 382/164 |
| 2009/0290762 A1* | 11/2009 | Guan et al. | 382/107 |
| 2010/0322300 A1* | 12/2010 | Li et al. | 375/240.01 |

OTHER PUBLICATIONS

Wimmer, et al. "A Person and Context Specific Approach for Skin Color Classification." ICPR IEEE. 2.18 (2006): 39-42. Print.*
Dadgostar, et al. "An adaptive real-time skin detector based on Hue thresholding: A comparison on two motion tracking methods." Pattern Recognition Letters. 27. (2006): 1342-1352. Print.*
Vladimir Vezhnevets, Vassili Sazonov and Alla Andreeva, "A Survey on Pixel-Based Skin Color Detection Techniques," Proc. Graphicon—2003, pp. 85-92, Moscow, Russia, Sep. 2003.
Michael J. Jones, James M. Rehg., "Statistical Color Models with Application to Skin Detection," International Journal of Computer Vision, 46, Jan. 1, 2002, pp. 81-96.
U.S. Appl. No. 12/197,912, filed Aug. 25, 2008.

* cited by examiner

*Primary Examiner* — Michael A Newman
(74) *Attorney, Agent, or Firm* — Wolfe-SBMC

(57) ABSTRACT

Systems, methods, and computer-readable storage media for automatically detecting skin tones in an input image are disclosed. An initial skin tone mask for the image may be created dependent on a general skin tone model. An upper threshold and/or a lower threshold may be applied to the initial skin tone mask to identify pixels most likely to be skin pixels and least likely to be skin pixels, respectively. These pixels may be used to produce an image-specific skin tone model, including one or more truncated Gaussian models for skin pixels and/or non-skin pixels defined in a three-dimensional color space. The image-specific skin tone model may be applied to the image to generate a final skin tone mask. Skin tone detection may be automatically or selectively performed in conjunction with image editing or image feature identification operations to target or exclude skin pixels or non-skin pixels during execution of the operations.

33 Claims, 14 Drawing Sheets

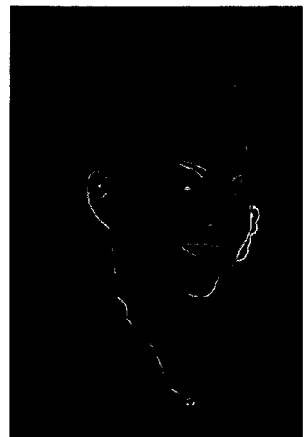  
FIG. 4A     FIG. 4B     FIG. 4C
  
FIG. 4D     FIG. 4E     FIG. 4F

SYSTEM AND METHOD FOR AUTOMATIC SKIN TONE DETECTION IN IMAGES

BACKGROUND

Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Vector graphics data may be stored and manipulated as one or more geometric objects built with geometric primitives. The geometric primitives (e.g., points, lines, polygons, Bézier curves, and text characters) may be based upon mathematical equations to represent parts of digital images. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Many digital image editing operations may be applied selectively to a portion of the digital image. In selecting a portion of the digital image, a mask may be used to define a portion of a digital image on which an operation is to be performed. A hard mask may represent a binary, "all or nothing" inclusion or exclusion of pixels. A soft mask may comprise a mask having intermediate values that lie between the minimum and maximum values for membership in the mask. For example, a soft mask may potentially comprise integer values between 0 and 255 or floating-point values between 0 and 1. Soft masks may be used for gradual blending of selected pixels into surrounding regions of the digital image. Suitable operations may be applied to modify a mask. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks.

A selection may represent a region of interest in the digital image and may include one or more pixels (comprising one or more color channels) and/or geometric objects. A selection may be represented by a mask having a single channel indicating per-pixel membership in the selection. If the mask is a soft mask, then the selection may have elements with partial membership (e.g., feathered edges) indicated by an intermediate value in the mask. In most digital image editors, selections may be generated in various ways. For example, a marquee tool may permit the selection of rectangular or elliptical areas in an image. A lasso tool may allow the user to draw a freehand selection area. A magic wand tool may permit the selection of parts of an image based on a color range of pixels. Facilities such as edge detection, masking, alpha compositing, and color and channel-based extraction may also be used to generate selections. The pixels and/or objects in the selection may be contiguous or non-contiguous.

The Gaussian Mixture Model (GMM) is a statistical model that is commonly used in a variety of research and application areas such as the modeling of color distributions in digital images. For example, GMMs have been used to model human skin color distributions in RGB color space. In interactive image segmentation systems, GMMs have been used to model the user selected foreground and background colors and to generate a foreground probability map. In prior approaches, a fixed number of full Gaussian functions are typically used in a particular GMM used for modeling color distributions. In prior approaches, such a GMM is typically built in an off-line model by collecting color samples and then building the GMM once based on the color samples; if new samples are provided, then a new color model is typically built. Various methods for building general skin color models have been developed in recent years, using different color spaces and statistical models, such as GMM. However, because these approaches are targeted at building general color models, their performances on a specific image may not be satisfactory.

SUMMARY

Systems, methods, and computer-readable storage media for automatically detecting skin tones in an input image are disclosed. In some embodiments, automated skin tone detection may include producing an image-specific skin tone mask, generated using the multiple step process described herein. The method may in some embodiments include accessing data representing an input image and creating an initial skin tone mask for the input image dependent on a general skin tone model. The general skin tone model may be any suitable general skin tone model, such as one based on a plurality of training samples. The initial skin tone mask may include a respective value for each of the pixels of the input image indicating a probability that the pixel is a skin pixel.

In some embodiments, the method may include applying an upper threshold to the initial skin tone mask to identify pixels of the image that are most likely to be skin pixels. It may also include applying a lower threshold to the initial skin tone mask to identify pixels that are least likely to be skin pixels. These most likely and least likely pixels may be submitted to a color range selection model (e.g., a skin model generator) to produce an image-specific skin tone model. The image-specific skin tone model may include one or more truncated Gaussian models defined in a three-dimensional color space that separates luminance from chrominance (e.g., RGB, Lab, etc.) The image-specific skin tone model may be applied to the input image to generate a final skin tone mask for the input image, such that the final skin tone mask includes a respective value indicating a degree of membership in the final skin tone mask for each of the pixels in the input image dependent on its similarity in color to the most or least likely skin pixels.

In some embodiments, automated skin tone detection may be performed as part of an image editing operation, and may be used to target skin pixels or non-skin pixels for the operation, or to exclude skin pixels or non-skin pixels from the operation. The operation may produce a modified version of the image, which may be rendered to a display device. For example, skin tone detection may be performed in conjunction with a filtering operation, a color correction operation, or a resizing operation, to target the operation to skin pixel or to protect skin pixels from the operation. In other embodiments, automated skin tone detection may be performed in conjunction with an image identification operation, i.e., an operation to identify a face, a human being, or adult content (e.g., pornographic elements) in the input image.

In some embodiments, automated skin tone detection may include modifying a skin tone model (e.g., a general skin tone model or an image-specific skin tone model) to compensate for an inherent color bias (e.g., a red bias) in the general skin tone model. An image-specific skin tone model produced using automated skin tone detection may include different clusters of skin tones and/or non-skin colors (e.g., corresponding to darker or lighter skin tones) in some embodiments, and users may be able to selectively target or exclude particular clusters through the user interface of a graphics application.

Automated skin tone detection may be invoked by default as part of executing various image processing operations in a given graphics application, or may be selectively enabled (i.e., turned on or off) in response to user input, in different embodiments.

The methods described herein may be implemented as program instructions, (e.g., stored on computer-readable storage media) executable by a CPU and/or GPU, in various embodiments. For example, they may be implemented as program instructions that, when executed, implement automated skin detection as a stand-alone operation or in conjunction with execution of an image processing operation in a graphics application.

BRIEF DESCRIPTION OF THE DRAWINGS

FIG. 4A illustrates an input image including skin tones and red tones.

FIGS. 4B-4C illustrate output skin tone masks, according to different embodiments.

FIG. 4D illustrates an input image including skin tones and red tones.

FIGS. 4E-4F illustrate output skin tone masks, according to different embodiments.

Figure 1A:
FIG. 1A illustrates an input image including skin tones.
Figure 1B:
FIGS. 1B-1C illustrate output images including skin tones following resizing, according to different embodiments.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Graphic applications include an ever-increasing number of image processing features. In various embodiments, these features may be able to take advantage of an automated skin tone detection mechanism, as described herein. For example, a graphics application may include image editing operations, such as various filtering options or resizing operations (e.g., for cropping, expanding, or reducing an image). A user of such an application may be able to specify that skin pixels should be included or excluded from these operations, in some embodiments. An automated skin tone detector may in some embodiments allow these operations to be automatically (or selectively) directed to areas of an image that include skin pixels, or may be used to automatically (or selectively) protect areas that include skin pixels from these operations. In another example, a graphics application may include various feature identification operations (e.g., for face recognition, recognition of people, or recognition of adult images, including pornographic images). An automated skin tone detector may in some embodiments provide an effective and efficient method of automatically (or selectively) identifying such features, or candidates thereof. Systems, methods, and computer-readable storage media for automatically generating a skin tone mask for an input image containing skin pixels are described herein, according to various embodiments.

One feature of an image editing application that may make use of automated skin tone detection, as described herein, is a seam carving operation. Seam carving is one of a variety of techniques may be used to resize an image, in various embodiments. Given an input image, to reduce the width, one or more seams in the image may be identified by a seam carving technique and removed from the image, while to increase the width one or more seams may be identified and replicated in the image. As used herein, the term "seam" refers to a set of pixels along a path from one edge of the image (e.g., the top of the image) to the opposite edge of the image (e.g., the bottom of the image) that satisfies the following two constraints:

1) The seam is monotonic, meaning (in this example) that its path only goes in one direction across the image (e.g., down), and does not reverse directions as it crosses the image (e.g., going down for a while and then up, or vice versa).
2) The seam comprises pixels that are "connected" to each other. In other words, for any given pixel of the seam (in this example), the pixel on the next row must be either directly below the given pixel or diagonally adjacent to the given pixel (e.g., one pixel to the left of the given pixel or one pixel to the right of the given pixel on the next row). For example, from any given pixel of the seam to the next pixel of the seam, the path cannot jump to a pixel 20 pixels away in the next row.

In various embodiments, seam carving techniques may be content sensitive, or context aware. For example, given an input image, the data representing the image may be processed to generate an alternate representation of the image, which may be referred to as an energy map. This energy map may indicate the importance of each pixel in terms of image resizing. A content-aware seam carving technique may in various embodiments assign an energy or weight to every pixel, and may use those values to identify one or more seams having a minimal cost with respect to a resizing operation. In other words, the content-aware seam carving technique may use the energy costs of each pixel to identify a path of pixels going from one edge of the image to the opposite edge of the image for which the sum of the energy values has the minimum value. A traditional seam carving operation may determine the energy of each pixel as the sum of the absolute gradient for each pixel. In other words, the energy of each pixel may be computed as a derivative of its neighbors, i.e., as a local energy function of the pixels adjacent to it. This energy function may define a linear relationship between the difference in intensity values of a pixel and its neighbors and the importance (or energy) of the pixel. For example, for a given pixel, if the difference between the intensity values of the pixels on its left and right is 17, the energy of the given pixel may be mapped to a value of 17. However, in some embodiments, skin pixels may be considered to be of higher importance than other pixels in an image, and may be mapped to higher values in the energy map than other pixels. This mapping may be performed in conjunction with, or instead of, applying a gradient function to the pixels, in various embodiments.

In some embodiments, the determination of the lowest cost seam(s) of an image may be solved efficiently using a technique called dynamic programming or shortest path. Once the lowest-cost seam has been identified, the image may be resized along the seam. For example, if the resizing operation is a reduction operation, the pixels associated with the lowest-cost seam may be removed. In this example, the seam carving operation would remove one pixel per row (because the seam is monotonic), and all the pixels to the right of the seam would be moved one pixel to the left to obtain an image that is one pixel narrower than the input image. By iteratively applying this technique, the image may be reduced to reach a target size and/or aspect ratio. Similarly, if the resizing operation is an expansion operation, the pixels associated with the lowest-cost seam may be replicated, and a copy of each pixel may be inserted into the image to the right of the seam. In this example, the seam carving operation would add one pixel per row, and all the pixels to the right of the seam would be moved one pixel to the right to obtain an image that is one pixel wider than the input image. By iteratively applying this technique, the image may be expanded to reach a target size and/or aspect ratio.

In some embodiments, a skin tone detector may be used to identify skin pixels in an input image, producing a skin tone mask of the input image. A skin tone mask, as used herein, may be a soft mask that assigns a weight to each pixel describing the probability that it is a skin pixel. In some embodiments, such a skin tone mask may be used to map skin pixels of an input image to higher values than non-skin pixels in an energy map of a seam carving operation, and may therefore be used to protect important image elements (e.g., faces or people) or preserve important image regions (e.g., those containing a large number of skin pixels) during a resizing operation.

Figure 1C:

In one example, a resizing operation (e.g., a reduction operation) may be performed on the input image shown in FIG. 1A, which depicts a child and a snowman. Traditional seam carving, e.g., using a gradient function, may remove one or more horizontal seams having low-cost values (according to a gradient function applied to the pixels of those seams), resulting in the image shown in 1B. In this example, traditional seam carving may produce a resized image with undesirable results, even though the operation may have removed pixels that were determined to be "less important" (e.g., due to the presence of similar pixels nearby). In other embodiments, rather than treating all pixel values as equally important, an alternate method for seam carving may treat the pixel values corresponding to particular colors or color ranges (e.g., skin tones) as being more important than the values of other pixels. In other words, even if the intensities (or gradients) of the pixels of a given seam are low relative to those of other seams, it may be undesirable to remove the seam. Instead, the energy values (i.e., the importance) of these pixels may be weighted so that they are higher than they would be if they were based solely on the gradient (e.g., on the values of other pixels the neighborhood). Such a method may produce a resized image such as that shown in FIG. 1C. In this example, the pixels making up the face of the child were protected from removal by being more heavily weighted than those of other elements depicted in the image.

In this example, the value of pixels that correspond to skin tone colors may be weighted so that a low-cost seam is less likely to pass through a region that includes skin pixels. Increasing the weight of the skin pixels may in one embodiment be implemented as follows: Let $D(p)$ denote the distance of the pixel color from some canonical skin color (e.g., in some color space such as RGB or Lab). In this example, a weight mask may be created as follows: $W(p)=\exp(-D(p)/v)$, where $W(p)$ is the weight of pixel p and v is a sigma value to control the width of the Gaussian. In this example, the closer the pixel value is to a skin tone color, the higher the weight that is assigned it. This method may be referred to as a single Gaussian technique for color classification. In typical skin tone detection algorithms, this generalized color modeling technique may be applied based on skin colors classified using a number of training samples.

The system and methods described herein may in some embodiments be used to automatically determine the probability that a given pixel is a skin pixel, and/or that a given pixel is a non-skin pixel, and this determination may be specific to a given input image. In such embodiments, the weight of each pixel may be computed dependent on the probability that the pixel is a skin pixel (or a non-skin pixel), as indicated by an image-specific skin tone mask of the input image, according to a multi-step mask generation mechanism, as described herein.

Figure 2:
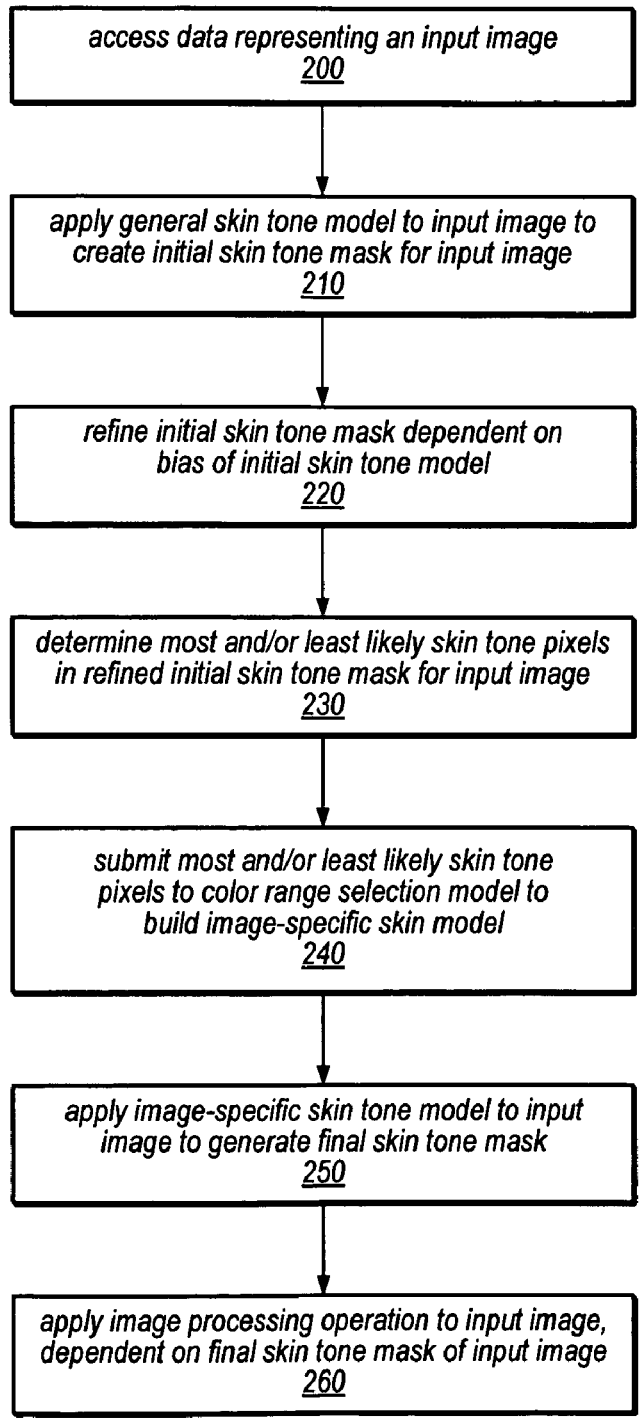
FIG. 2 is a flow chart illustrating a method for generating an image-specific skin tone mask, according to various embodiments.

One method for generating an image-specific skin tone mask is illustrated in FIG. 2. In this example, a graphics application may access data representing an input image, as in 200. The graphics application may be any of a variety of applications, and may include image editing operations, filtering operations, resizing operations, and/or feature identification operations. In some embodiments, the graphics application may include functionality to allow a user to select one or more colors or color ranges (e.g., skin tones) to be targeted for or protected from such image processing operations by identifying them through a user interface of the application (e.g., using a selection tool, pull-down menu, radio button, or alphanumeric input field). For example, a user may indicate that skin pixels should be automatically color-corrected, or that skin pixels should be protected from resizing operations by selecting a radio button associated with such features, e.g., "correct skin tones," or "protect skin tones." In other embodiments, the graphics application may automatically correct or protect skin tones as part of its normal operation, e.g., when a general color correction operation is invoked or a resizing operation is performed.

In the example illustrated in FIG. 2, a general skin tone model is applied to the input image to create an initial mask for skin tones areas of the input image. For example, the single Gaussian method described above may be applied to the input image to create the initial skin tone mask, in one embodiment. As noted above, this method may use a general statistic model of skin tones built using any number of training samples, for which skin pixels and/or non-skin pixels have been explicitly classified, e.g., manually. In other embodiments, any general skin tone modeling approach may be applied to the input image to create the initial skin tone mask. For example, various non-parametric modeling methods may be used to determine the likelihood that a given pixel is (or is not) a skin pixel based on training data without deriving an explicit model of skin color(s). These methods may include normalized histograms or lookup tables, a Bayes classifier approach, or self-organizing maps of skin pixels and non-skin pixels, and may be applied in a variety of color spaces, in different embodiments. Alternatively, various parametric methods, such as the single Gaussian method described above, a mixture of Gaussians, multiple Gaussian clusters, or an elliptic boundary model may be applied in various color spaces, in different embodiments. The color spaces in which a general skin tone modeling method may be applied may include an RGB color space, a normalized RGB color space, a hue-saturation based color space (e.g., HSI, HSV, or HSL), a TSL color space, a YcrCb color space, an LAB color space, LUV color space, UVW color space, or other derivative of the XYZ color space, or any other suitable color space, in different embodiments. As previously noted, statistical skin tone and/or non-skin color models may be determined in any of these color spaces using any of the general techniques described above to create the initial skin tone mask for the input image, in different embodiments.

In one embodiment, the initial skin tone mask may be created using an approach that includes two predefined color models, a skin color model and a non-skin color model. Both the skin tone model and the non-skin model may be mathematically described as Gaussian Mixtures Models (GMMs), in which all the parameters are obtained by using a large number of skin images and non-skin images as training data. In other words, this approach involves building a group of skin color clusters and a group of non-skin color clusters in the RGB color space. In this approach, given an input color, the two models compete with each other to assign a skin probability to each pixel.

Figure 3A:
FIG. 3A illustrates an input image including skin tones.
Figure 3B:
FIGS. 3B-3C illustrate output skin tone masks, according to different embodiments.

The mask generated by this approach may be of unsatisfactory quality, since it is based on a very general model, and its parameters are not optimized for a specific target image. An example of the application of this approach is shown in FIGS. 3A and 3B. Specifically, FIG. 3A depicts an input image, and FIG. 3B depicts an initial skin tone mask created using the approach described above. In this example, the initial skin tone mask created by the general skin tone modeling approach is very noisy.

Note that some general skin tone modeling techniques exhibit a color bias. The methods described herein may in some embodiments include refining the initial skin tone mask to compensate for such biases, as shown in 220 of FIG. 2. For example, the general skin color model described above tends to favor reddish colors, thus reddish objects are often mistakenly identified as probable skin regions. Some examples of this bias are shown in FIGS. 4A-4F. FIG. 4A depicts a woman wearing a red blouse. The initial skin tone mask depicted in FIG. 4B, which was created using the method described above, incorrectly identifies most of the pixels of the blouse as skin pixels. The skin tone mask depicted in FIG. 4C, which has been refined to compensate for this bias, does not include the pixels of the blouse. Similarly, FIG. 4D depicts a woman sitting on a red couch. The initial skin tone mask depicted in FIG. 4E incorrectly identifies some of the pixels of the couch as skin pixels. The refined skin tone mask depicted in FIG. 4F includes only a few of the pixels of the couch.

In one embodiment, the method may reduce the effects of a red bias of the general skin color model described above by augmenting the general color model, e.g., by adding a negative skin Gaussian cluster near the red color in the RGB color space. In this example, to account for illuminant changes, given an input RGB color, the normalized color (R*255/(R+G+B), G*255/(R+G+B), B*255/(R+G+B)) may be used as the input to the Gaussian. Shown below is an example of pseudo code for generating a skin probability p for an input color RGB, according to one such embodiment:

RefinedInitialSkinProbability(RGB)

(1) Compute a skin probability using the positive skin color models described above, as p_skin;

(2) Compute a non-skin probability using the negative skin color models described above, as p_nonskin;

(3) Compute normalized color as $$R *= \frac{R}{R+G+B}, G *= \frac{G}{R+G+B}, B *= \frac{B}{R+G+B}, \text{and}$$

and compute a red color probability as p_red(R*,G*,B*);

(4) Compute the final non-skin probability as p*_nonskin=max(p_red,p_nonskin);

(5) Compute the final skin probability as $$p^*\_skin = \frac{p\_skin}{p\_skin + p^*\_nonskin}$$

Figure 3C:
Figure 5:
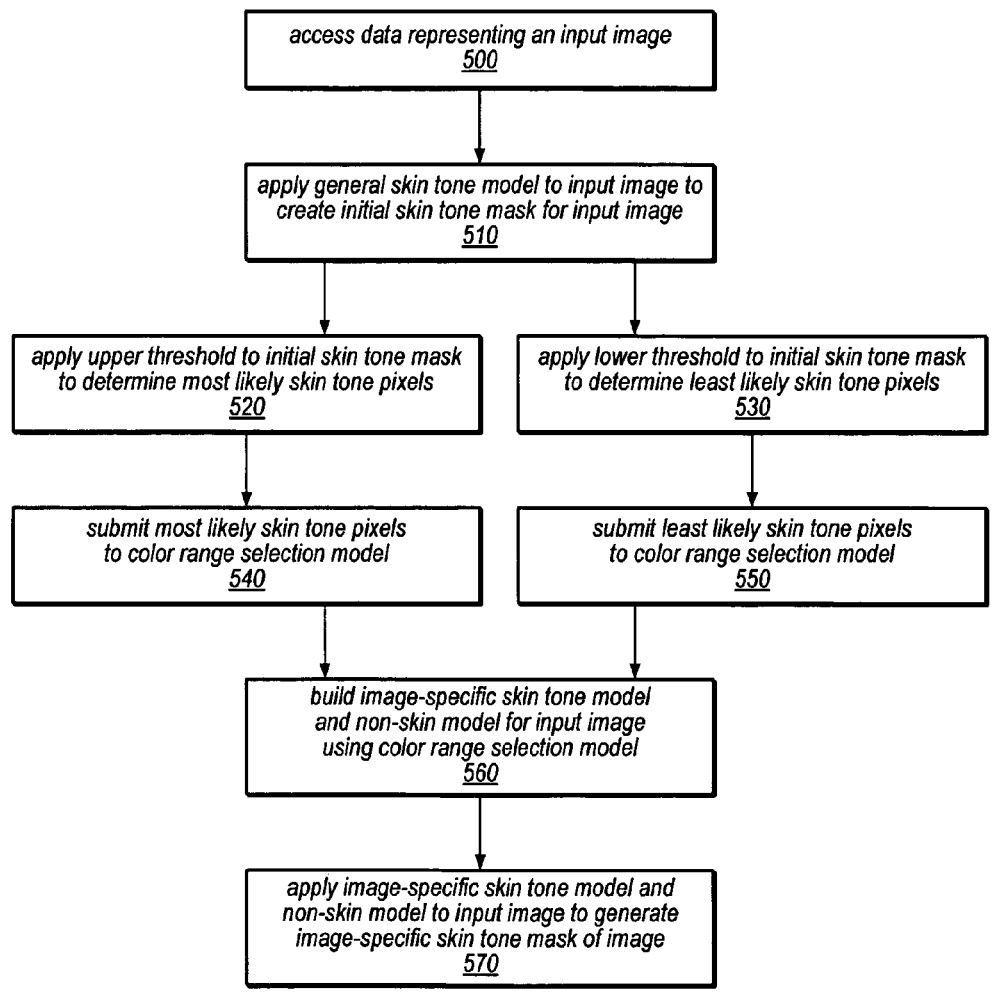
FIG. 5 is a flow chart illustrating a method for building and using an image-specific skin tone model, according to various embodiments.

In the example, illustrated in FIG. 2, the method may include determining the most and/or least likely skin pixels in the refined initial skin tone mask for the input image, as in 230. One method for making these determinations is illustrated in FIG. 5 and described below. In this example, the most and/or least likely skin pixels may be submitted to a color range selection model to build an image-specific skin color model using the skin colors presented in the input image, as in 240. This image-specific skin tone model may be applied to the input image to generate a final skin tone mask, as in 250, and may significantly improve the quality of the skin tone mask of the input image over the use of the general skin tone models described above. FIG. 3C depicts a final skin tone mask for the input image shown in FIG. 3A, according to one embodiment. As illustrated in this example, the final skin tone mask is considerably less noisy than the initial skin tone mask shown in FIG. 3B.

As discussed above, the final skin tone mask of the input image may be used by one or more image processing operations of a graphics application, as in 260. For example, the final skin tone mask may be stored for later use and/or may be input to an image editing operation (e.g., a resizing operation), a filtering operation, or a feature identification operation to direct the operation to skin pixels or to exclude skin pixels from the operation, in various embodiments.

Note that while the example illustrated in FIG. 2 includes an adjustment of the general skin tone model dependent on an inherent bias of the general skin tone model used, in other embodiments, such an adjustment may be made on the image-specific skin tone model instead of on the general skin tone model.

FIG. 5 illustrates a method of generating an image-specific skin tone model of an input image, according to one embodiment. In this example, the method may include accessing data representing an input image, as in 500. As in the previous example, the method may include applying a general skin tone model to the input image to create an initial skin tone mask for the input image, as in 510.

In this example, an upper threshold (e.g., 120) is applied to the initial skin tone mask, and any pixels whose initial alpha values are greater than the upper threshold in the initial mask image may be treated as possible skin pixels, as in 520. In other words, pixels having initial alpha values greater than the upper threshold are determined to be the most likely to be skin pixels. Similarly, a lower threshold (e.g., 50) may be applied to the initial skin tone mask, as in 530, and any pixels whose initial alpha values are lower than the lower threshold may be treated as non-skin pixels, i.e., they are determined to be the least likely to be skin pixels. These classification operations (at 520 and 530) may provide image-specific skin and non-skin color samples which can be used for building a skin color model for this input image.

In the example illustrated in FIG. 5, these most likely skin pixels and least likely skin pixels may be submitted to a color selection range selection model (as in 540 and 550) to build the image-specific skin tone model for the input image, as in 560. For example, in one embodiment, all of the most likely skin pixels may be used to train a statistical skin color model and all the least likely skin pixels may be used to train a statistical non-skin color model, e.g., using a dynamic multi-Gaussian model, as described in more detail below. Finally, in this example, the image specific skin tone model and non-skin model may be applied to the input image to generate the final skin tone mask of the input image, as in 570.

Note that while the embodiment illustrated in FIG. 5 includes both a skin tone model and a non-skin model built from image-specific training samples, in other embodiments, an automated skin tone detector may build only one of these models, or may build multiple skin tone models and/or non-skin models, e.g., based on different skin tone clusters.

Figure 6:
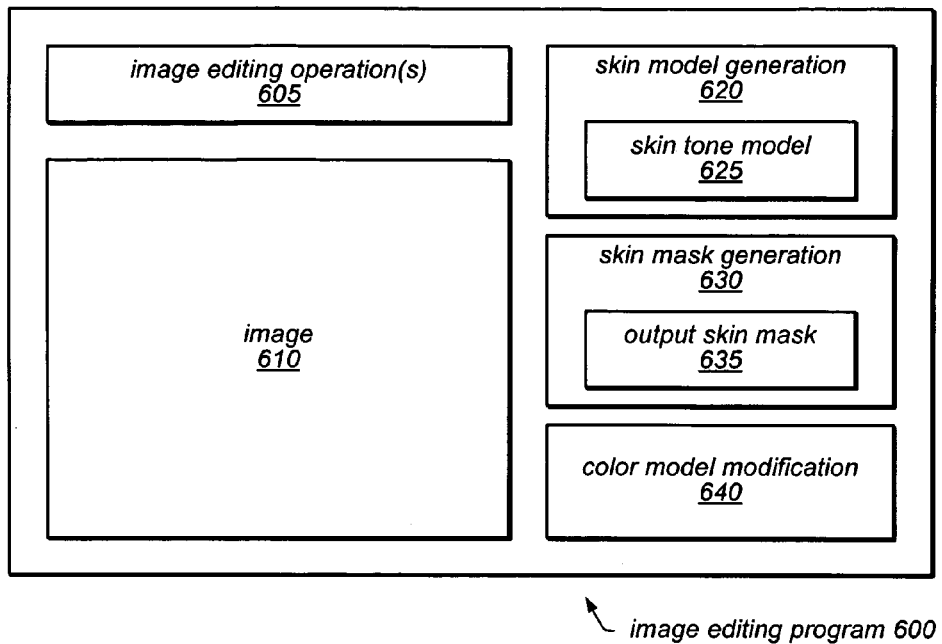
FIG. 6 is a block diagram illustrating an embodiment of a digital image editing program configured for mask generation based on a skin tone model.

Using embodiments of the systems and methods described herein, a mask based on an image-specific color model may be generated for application of image-editing operations to desired portions of an image. FIG. 6 is a block diagram illustrating an embodiment of a digital image editing program configured for mask generation based on an image-specific skin tone model. In this example, digital image editing program 600 may comprise one or more image editing operations 605. In one embodiment, a suitable product such as Adobe Photoshop®, Adobe Illustrator®, or Adobe AfterEffects® (all available from Adobe Systems, Inc.) may be used as the image editing program 600. The image editing program 600 may be used to create and/or modify a digital image 610. The image editing operations 605 may comprise suitable operations for modifying pixels and/or geometric objects of the image 610. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to images (including selections within an image) and/or masks.

As will be discussed in greater detail below, a skin tone model 625 associated with the image 610 may be generated using skin model generation facilities 620. As will also be discussed in greater detail below, an output skin tone mask 635 associated with the image 610 may be generated using skin mask generation facilities 630. As will be discussed in greater detail below, the skin tone model 625 may be modified using one or more color model modification techniques 640 to produce an updated skin tone model. The skin tone model generation facilities 620, skin mask generation facilities 630, and color model modification techniques 640 may comprise program instructions that may be executed in association with the image editor 600. In various embodiments, the program instructions for skin tone model generation facilities 620, skin mask generation facilities 630, and/or color model modification techniques 640 may be coded as an intrinsic part of the image editor 600 or as a plug-in module or other extension to the image editor 600. The image editing program 600 and its constituent elements and data may be stored in a memory of a computer system, shown as graphics application 1520 in FIG. 15.

Figure 7:
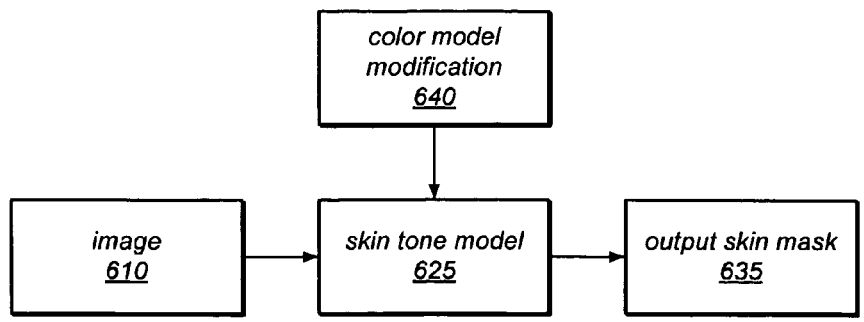
FIG. 7 illustrates a workflow associated with skin tone mask generation based on a skin tone model, according to one embodiment.

FIG. 7 illustrates a workflow associated with skin mask generation based on a skin tone model according to one embodiment. The skin tone model 625 may be generated, at least in part, based on pixels in the input image 610. The output skin tone mask 635 may be generated, at least in part, based on the skin tone model 625. In one embodiment, the output skin tone mask 635 may be generated by building a statistical skin tone model 625 based on most likely skin pixels and/or least likely skin pixels (as described above) and applying the model to the pixels in the input image 610. One or more of the color model modification techniques 640 may be used to modify or update the skin tone model 625 without the need to generate a new skin tone model.

Figure 8:
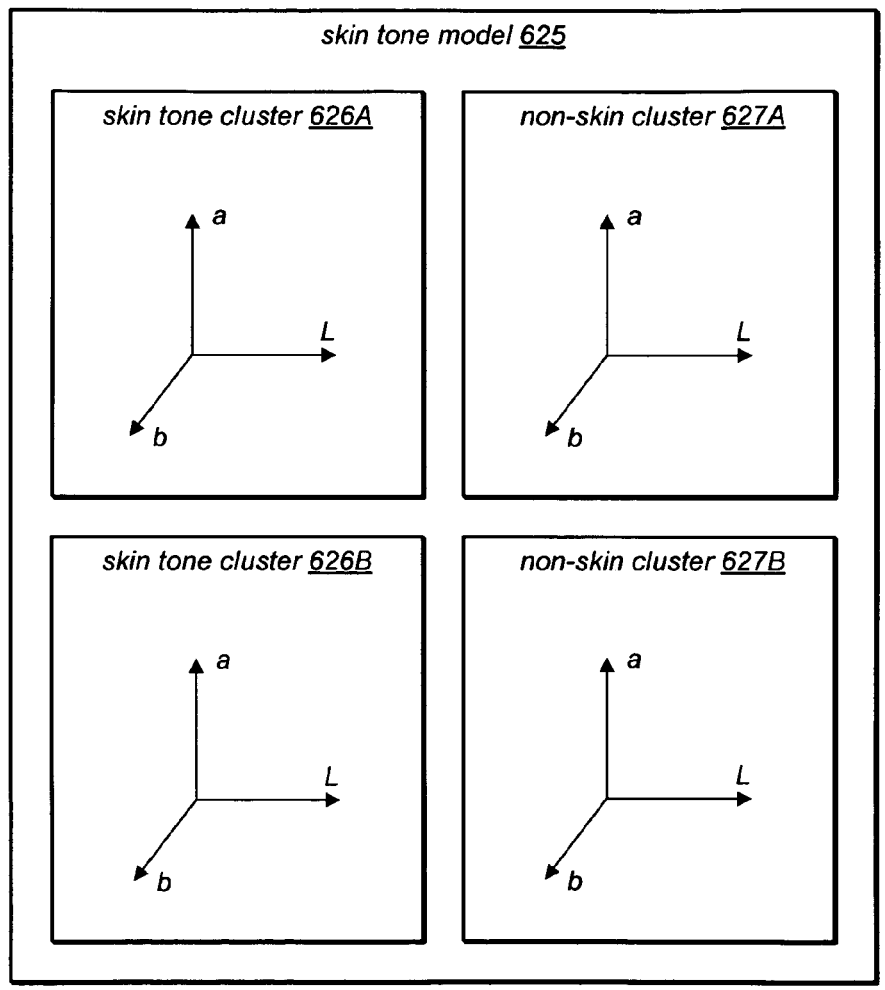
FIG. 8 illustrates a skin tone model including two skin tone clusters and two non-skin clusters, according to one embodiment.

In various embodiments, skin tone model 625 may comprises one or more skin tone clusters 626 and one or more non-skin clusters 627. For example, since human skin may vary in tone from a dark brown to a light, nearly colorless tone, skin tone model 625 may include two or more skin tone clusters, each representing a relatively narrow (and possibly non-overlapping) range of possible skin tones. These skin tone cluster(s) 626 may model the most likely skin pixels, determined as described above. Similarly, non-skin cluster(s) 627 may model the least likely skin pixels, determined as described above. FIG. 8 illustrates a skin tone model 625 including two skin tone clusters 626 and two non-skin clusters 627, according to one embodiment. Each cluster may comprise a plurality of truncated Gaussian functions. Together, a skin tone/non-skin cluster pair (or multiple such pairs) may be used to compute an output skin tone mask 635. The use of truncated Gaussian functions may permit the generation of a suitable skin tone mask 635 based on a smaller number of skin tone and/or non-skin samples than may be required by the use of full Gaussian functions.

In one embodiment, the truncated Gaussian functions may be defined in a color space that separates luminance from chrominance. In one embodiment, for example, the truncated Gaussian functions may be defined in a Lab 3D color space (rather than, for example, an RGB color space). A Lab color space may comprise a color-opponent space with dimension L for lightness and dimensions a and b for the color-opponent dimensions. In one embodiment, the truncated Gaussian functions may be defined in a YCbCr color space. In a YCbCr color space, Y is the luminance component and Cb and Cr are the blue-difference and red-difference chrominance components.

The output skin tone mask 635 may represent particular regions or objects in the image 610 that include skin pixels. The output skin tone mask 635 may include various elements (e.g., pixels) that are contiguous or not contiguous. In one embodiment, the output skin tone mask 635 may be a soft mask that includes one or more pixels having intermediate values. The range of values in the soft mask may be represented as values in an alpha channel (e.g., alpha values). For example, if full exclusion from the output skin tone mask 635 is indicated by a value of zero, and if full inclusion in the output skin tone mask 635 is indicated by a value of one, then a range of intermediate values between zero and one (e.g., 0.5) may indicate partial or "soft" inclusion in the output skin tone mask 635. Alternatively, integer values in an appropriate range (e.g., 0 and 255) may be used. This partial inclusion of some pixels may be used for transparency effects, feathering effects, blending effects, etc.

In one embodiment, an initial skin tone model 625 created using a general skin tone model (such as described above) may be automatically updated based on image-specific inputs (e.g., the most and least likely skin pixels, as determined above), and the output skin tone mask 635 may be automatically adjusted as a result of the updating of the skin tone model 625. In one embodiment, the color model modification techniques 640 may include the ability to add image-specific colors to an initial skin tone model 625. For example, the most likely skin pixels may be input to the color model modification facility 640 to indicate that pixels with these or similar colors should have higher alpha values in the resulting skin tone mask 635. Thus, the pixels with colors that are the most likely to be skin pixels may be selected as skin pixels in the resulting skin tone mask 635. In one embodiment, the color model modification techniques 640 may include the ability to subtract image-specific colors from an initial skin tone model 625. For example, the least likely skin pixels may be input to the color model modification facility 640 to indicate that pixels with these or similar colors should have lower alpha values in the resulting skin tone mask 635. Thus, the least likely skin pixels may be excluded from the resulting skin tone mask 635.

In one embodiment, a skin tone cluster 626 may be denoted as $M_S$, and a non-skin cluster 627 may be denoted as $M_N$. Each truncated Gaussian function in the foreground cluster may be denoted as $M_S^i$, and each truncated Gaussian function in the background cluster may be denoted as $M_N^j$. Mathematically, given a pixel I=(l,a,b), its alpha value may be computed as:

$$p = \max_i(M_S^i(l, a, b)) - \max_j(M_N^j(l, a, b)) \quad (1)$$

In one embodiment, because added colors (e.g., those corresponding to the most likely skin pixels) and subtracted colors (e.g., those corresponding to the least likely skin pixels) are modeled separately, the skin tone model 625 may not be subtracted to zero. In one embodiment, the numbers of Gaussian functions may be dynamically adjusted, as will be described in greater detail below. In one embodiment, the value p is truncated to make it strictly vary between 0 and 1.

In one embodiment, the three channels may be treated independently if the input colors are in Lab color space, such that:

$$\begin{cases} M_S^i(l, a, b) = G_{Sl}^i(l) \cdot G_{Sa}^i(a) \cdot G_{Sb}^i(b) \\ M_N^i(l, a, b) = G_{Nl}^i(l) \cdot G_{Na}^i(a) \cdot G_{Nb}^i(b) \end{cases} \quad (2)$$

In this example, $G_{Sl}^i(l)$, $G_{Sa}^i(a)$, and $G_{Sb}^i(b)$ are three one-dimensional truncated Gaussian functions.

Figure 9:
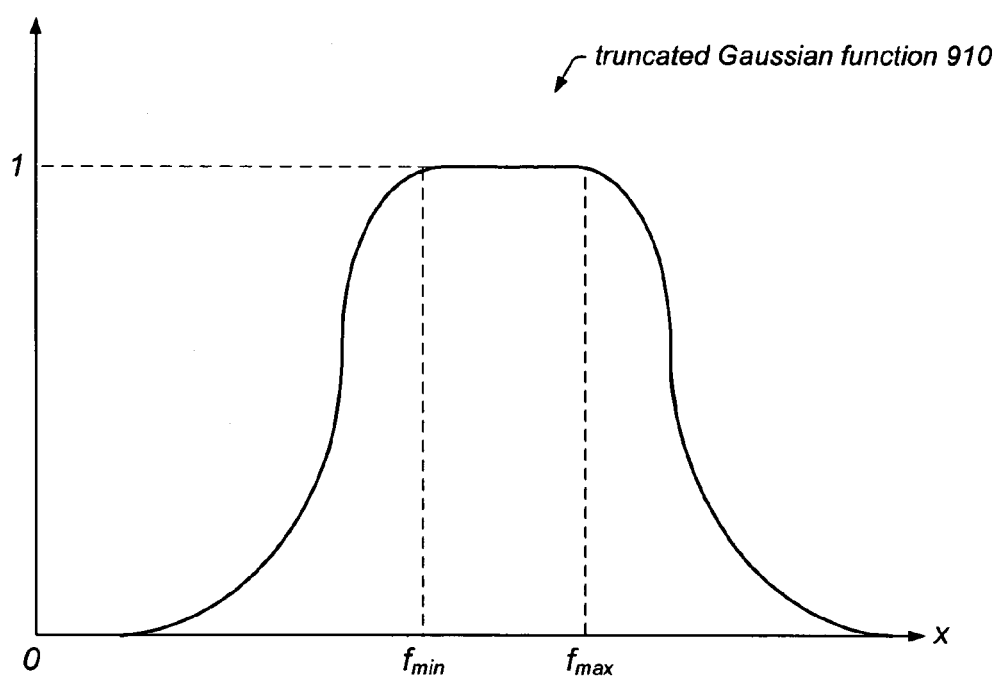
FIG. 9 illustrates an example of a one-dimensional truncated Gaussian function, according to one embodiment.

FIG. 9 illustrates an example of a one-dimensional truncated Gaussian function 910 according to one embodiment. In one embodiment, the truncated Gaussian function 910 may be used because it may better encapsulate multiple input values than a complete Gaussian shape. The truncated Gaussian function 910 may be defined as:

$$G(x | f_{min}, f_{max}, \sigma) = \begin{cases} \exp(-(f_{min} - x)^2/\sigma^2) & x < f_{min} \\ 1, & f_{min} < x < f_{max} \\ \exp(-(f_{max} - x)^2/\sigma^2) & x > f_{max} \end{cases} \quad (3)$$

The value σ is the variance of the Gaussian and may be referred to herein as the "color tolerance" of the skin tone model 625.

In one embodiment, the number of Gaussian functions in the skin tone model 625 may vary. The number of Gaussian functions in both the skin tone cluster 626 and the non-skin cluster 627 may be dynamically adjusted in order to generate a better selection result. For example, the number of Gaussians may be dynamically adjusted according to additional input. The additional input may comprise user input such as additional color samples (e.g., colors of additional pixels determined likely to be skin pixels or unlikely to be skin pixels), or a user selection of a broader or narrower range of skin tones (e.g., user input explicitly selecting or excluding one of a plurality of skin tone clusters or non-skin clusters). The variance of each Gaussian function may also be dynamically adjusted in order to account for overlapping skin tone and non-skin colors, in some embodiments. In this manner, an existing skin tone model 625 may be adjusted (i.e., by modifying its parameters) based on additional input without the need to build a new model. In one embodiment, the skin tone model 625 may be updated automatically if a user provides new color skin or non-skin color samples and/or specifies one or more clusters for inclusion or exclusion in skin tone mask 635.

Figure 10:
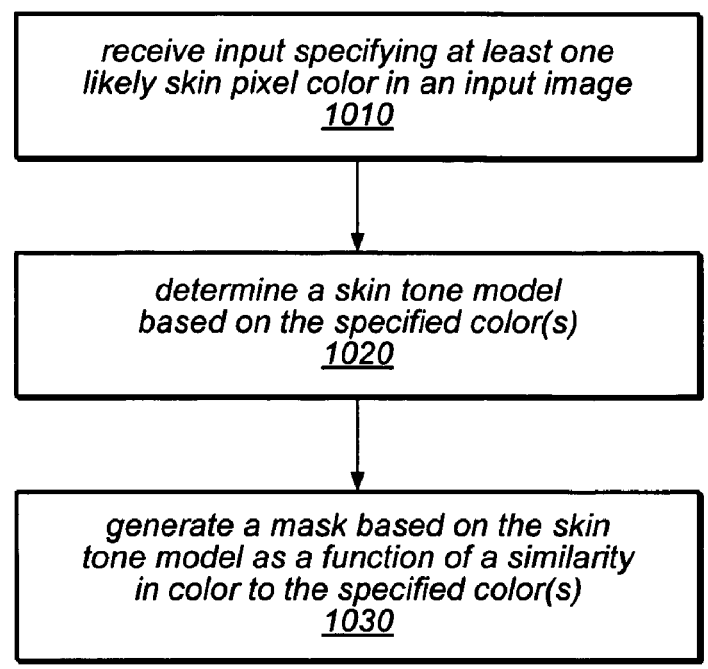
FIG. 10 is a flowchart illustrating a method for generating a skin tone mask based on a skin tone model, according to one embodiment.

FIG. 10 is a flowchart illustrating a method for generating a skin tone mask based on a skin tone model according to one embodiment. As shown in 1010, input specifying at least one likely skin pixel color in an input image 610 may be received. The input image 610 may comprise a plurality of pixels, and the likely skin pixel color may correspond to one or more pixels determined likely to be a skin pixels as described above. As shown in 1020, a skin tone model 625 may be determined based on the input. In one embodiment, the skin tone model may comprise one or more truncated Gaussian functions. As shown in 1030, a skin tone mask 635 may be generated based on the skin tone model. The skin tone mask may comprise a respective value indicating a degree of membership in the mask for each of the plurality of pixels in the input image. The mask may be a soft mask, and the value indicating a degree of membership may be an intermediate value between a maximum and a minimum value in the mask. In one embodiment, the degree of membership in the mask is a function of a similarity in color to the at least one likely pixel color. Thus, the skin tone model may be used to generate a skin tone mask including a range of colors in the input image. The skin tone mask may be used to apply one of the image-editing operations 605 to desired portions of the image, or to exclude desired portions from the operation, in different embodiments.

In one embodiment, at initialization of the image-specific skin tone model 625, the number of skin tone and non-skin Gaussian functions may be zero (e.g., if a general skin tone model used to create the initial skin tone mask does not include Gaussian functions). As described herein, a new color may be added to the skin tone model 625 by applying an upper threshold to an initial skin tone mask for the input image 610, thereby determining the most likely skin pixels in the input image. In one embodiment, the addition of a new color to the skin tone model may result in an automatic determination as to whether the new color will be used to create a new skin tone Gaussian, update a skin tone Gaussian, or delete a non-skin Gaussian.

Figure 11:
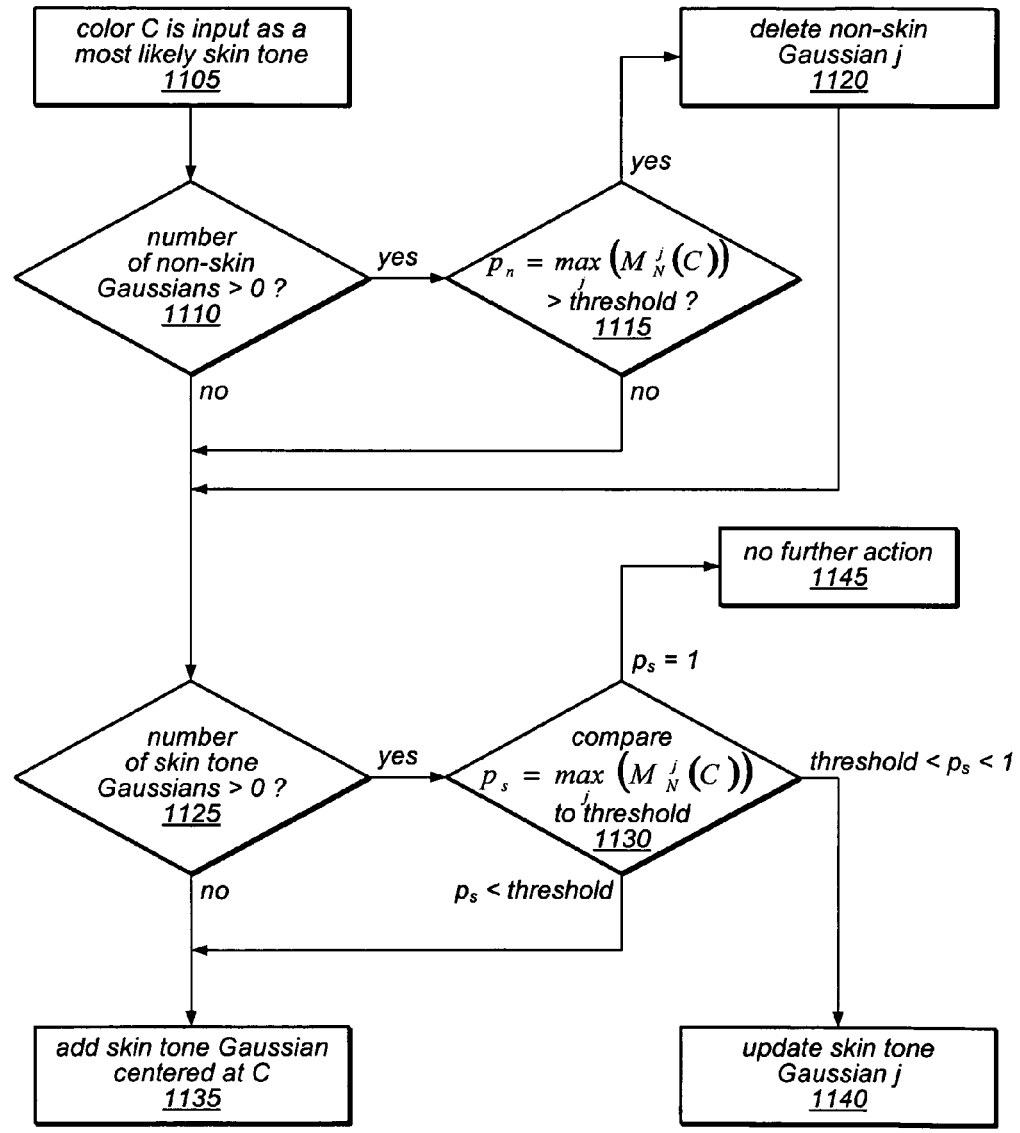
FIG. 11 is a flowchart illustrating a method for adding a skin tone to a skin tone model, according to one embodiment.

FIG. 11 is a flowchart illustrating a method for adding a color to a skin tone model according to one embodiment. As shown in 1105, a color C is input (e.g., to a color model modification facility) as a most likely skin tone. The input color C is first compared to the existing non-skin Gaussians, if any, to use any existing non-skin Gaussians to compute a probability for the input color, e.g., using Equation (2) above. If the probability is large, then the color has already been modeled as a non-skin color, and the corresponding non-skin Gaussian may be deleted in order to re-model it as a skin tone Gaussian. Thus, as shown in 1110, it is determined whether the number of non-skin Gaussian functions (e.g., the number of truncated Gaussian functions in the non-skin cluster) is greater than zero. If so, then as shown in 1115, it is determined whether a probability value $$p_n = \max_j(M_N^j(C))$$

is greater than a threshold value. If $p_n$ exceeds the threshold, then the non-skin Gaussian function j is deleted, as shown in 1120.

The input color C is then compared to existing skin tone Gaussians, if any. As shown in 1125, it is determined whether the number of skin tone Gaussian functions (e.g., the number of truncated Gaussian functions in the skin tone cluster) is greater than zero. If not, then a new skin tone Gaussian function centered at C is added, as shown in 1135. However, if the number of skin tone Gaussians is greater then zero, then as shown in 1130, a probability value $$p_s = \max_j(M_N^j(C))$$

is compared to a threshold value. In one embodiment, the threshold value used in 1130 is 0.75. In one embodiment, the threshold value used in 1130 is the same as the threshold value used in 1115; in another embodiment, the thresholds differ. If $p_s$ is less than the threshold, then as shown in 1135, a new skin tone Gaussian function centered at C is added because the input color C is sufficiently different from the existing skin tone Gaussians. If $p_s$ is greater than the threshold but less than 1, then as shown in 1140, the skin tone Gaussian function j is updated using the input color C because the Gaussian function j is similar in color to C. If $p_s$ equals 1, then the color C has already been modeled as a skin tone Gaussian, and no further action is taken, as in 1145.

In one embodiment, pseudo-code for an AddSkinColor( ) function that implements the method illustrated in FIG. 11 is as follows:

```
AddSkinColor(color)
   if (number of non-skin Gaussians M_N^j >0)

p_nonskin = max(M_N^j(color));
               j

If( p_ nonskin > threshold) DeleteNonSkinGaussian(j);
   Endif
   if (number of non-skin Gaussians M_S^j >0)

p_skintone = max(M_S^j(color))
                j if( p_skintone ==1.0) return;
      else if( p_skintone <1.0 && p_skintone > threshold)
         UpdateSkinToneGaussian(j, color);
         Return;
      endif
   endif
   AddNewSkinToneGaussian(color);
End
```

The UpdateSkinToneGaussian( ) function may re-adjust or expand $f_{min}$ and $f_{max}$ value to cover the input color. The AddNewSkinToneGaussian( ) function may create a real Gaussian by setting $f_{min}=f_{max}=$color.

Figure 12:
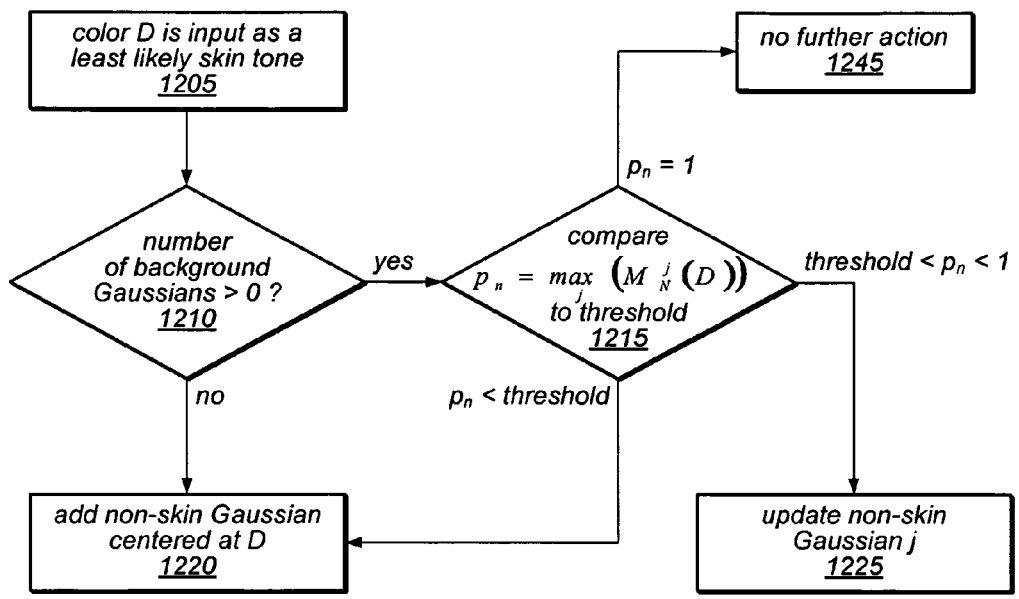
FIG. 12 is a flowchart illustrating a method for subtracting a non-skin color from a skin tone model, according to one embodiment.

FIG. 12 is a flowchart illustrating a method for subtracting a color from a skin tone model according to one embodiment. Subtracting a color from a skin tone model may result in adding the color to the non-skin Gaussian functions. As shown in 1205, a color D is input (e.g., to a color model modification facility) as a least likely skin tone. The input color D may be compared to the existing non-skin Gaussians, if any. If the input color is sufficiently close to an existing non-skin Gaussian, then the input color may be used to update that existing Gaussian. If the color is sufficiently far away from all existing non-skin Gaussians, then a new non-skin Gaussian may be added to the skin tone model based on the input color D. Thus, as shown in 1210, it is determined whether the number of non-skin Gaussian functions (e.g., the number of truncated Gaussian functions in the non-skin cluster) is greater than zero. If not, then a new non-skin Gaussian function centered at D is added, as shown in 1220. However, if the number of non-skin Gaussians is greater then zero, then as shown in 1215, a probability value $$p_n = \max_j(M_N^j(D))$$  (3)

is compared to a threshold value. If $p_n$ is less than the threshold, then as shown in 420, a new non-skin Gaussian function centered at D is added because the input color D is sufficiently different from the existing non-skin Gaussians. If $p_n$ is greater than the threshold but less than 1, then as shown in 1225, the non-skin Gaussian function j is updated using the input color D because the Gaussian function j is similar in color to D. If $p_n$ equals 1, then the color D has already been modeled as a non-skin Gaussian, and no further action is taken, as shown in 1245.

In one embodiment, pseudo-code for a SubtractSkinColor function that implements the method illustrated in FIG. 12 is as follows:

```
SubtractSkinColor(color)
  if (number of non-skin Gaussians M_N^j >0)

p_nonskin = max (M_N^j (color));
              j if( p_nonskin==1.0) return;
    else if( p_nonskin <1.0 && p_nonskin > threshold)
      UpdateNonSkinGaussian(j, color);
      Return;
    endif
  endif
  AddNewNonSkinGaussian(color, σ);
End
```

In one embodiment, the color tolerance parameter $\sigma_0$ may be modified (e.g., by a user). If the input color type is expressed in a Lab color space, then the skin tone model may be set initially such that $\sigma_L = \sigma_0$ and $\sigma_A = \sigma_B = \sigma_0/3$. If the user sets a new tolerance $\sigma_1$, the ratio $\sigma_1/\sigma_0$ may be used to adjust the tolerance of each existing Gaussian. In this manner, the tolerance of the L component may be specified differently from the tolerance of the a and b components. In one embodiment, a separate tolerance value may be maintained for each Gaussian function.

In one embodiment, the skin tone model may be extended to include spatial dimensions in addition to the existing color-related dimensions. For example, the skin tone model may be extended from three dimensions (3D) to five dimensions (5D). The additional dimensions may provide a higher degree of freedom to control the behavior of the model. In a 3D color model, an input color may be expressed in a format such as (R,G,B) or (L,a,b). In the 5D color model, an input color may be expressed in a format such as (R, G,B,x,y) or (L,a,b,x,y). The additional values x and y may represent normalized spatial locations of a likely skin pixel such that 0<x<1 and 0<y<1. Thus, a pixel corresponding to an input skin tone color (e.g., a likely skin pixel whose color is to be added to the skin tone model), the location of the pixel in addition to its color may be used to build or modify the skin tone model. The 5D color model may therefore comprise a location-weighted color model. The resulting skin tone mask may similarly reflect the location of the input color, as will be discussed below.

In one embodiment, both location dimensions and color dimensions in the 5D color model may be represented by truncated Gaussian functions. Similar to Equation (1) for the 3D color model, the skin tone probability of a pixel (L, a, b, x, y) in the 5D color model may be computed as:

$$p = \max_i(M_S^i(l, a, b, x, y)) - \max_j(M_N^j(l, a, b, x, y))$$  (4)

The use of a Lab color space may permit a 5D Gaussian function to be expanded as a dot product of five one-dimensional (1D) Gaussian functions. The probability computed from each Gaussian cluster may be computed as:

$$\begin{cases} M_S^i(l, a, b, x, y) = G_{Sl}^i(l) \cdot G_{Sa}^i(a) \cdot G_{Sb}^i(b) \cdot G_{Sx}^i(x) \cdot G_{Sy}^i(y) \\ M_N^j(l, a, b, x, y) = G_{Nl}^j(l) \cdot G_{Na}^j(a) \cdot G_{Nb}^j(b) \cdot G_{Nx}^j(x) \cdot G_{Ny}^j(y) \end{cases}$$  (5)

In one embodiment, the color and/or spatial covariance of each Gaussian may also be dynamically adjusted based on additional input. The parameter $\sigma_s$ is the tolerance parameter for the two extra spatial Gaussian functions. The spatial tolerance parameter $\sigma_s$ may be user-modifiable using any suitable user interface option, such as a slider bar. Modification of the spatial tolerance parameter may alter the degree of the location-weighting in the skin tone model and the resulting skin tone mask.

By using spatial Gaussian functions, the application of the skin tone model may be restricted to a particular region of the image instead of the entire image. Although the output skin tone mask would be based on the same input image, the use of the additional spatial parameters may result in a skin tone mask 635 that is weighted by location. In this manner, the use of a location-weighted color model may permit the selection of skin pixels in a particular region of the image to the exclusion of similarly colored pixels located in other regions throughout the image.

Figure 13:
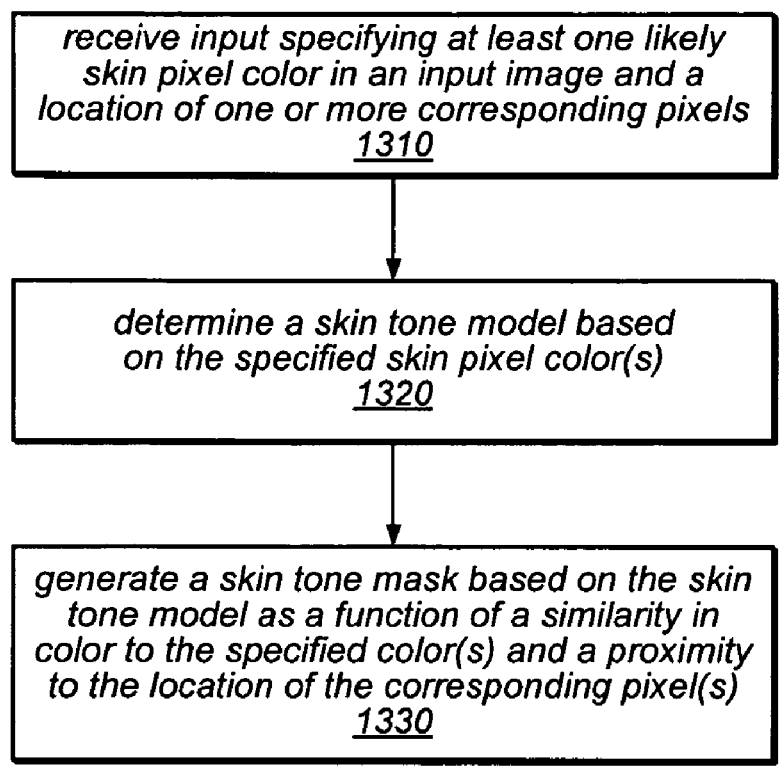
FIG. 13 is a flowchart illustrating a method for generating a skin tone mask based on a skin tone model including spatial dimensions, according to one embodiment.

FIG. 13 is a flowchart illustrating a method for generating a skin tone mask based on a skin tone model including spatial dimensions according to one embodiment. As shown in 1310, an input specifying at least one likely skin pixel (including its color and location) in an input image 610 may be received. The input image 610 may comprise a plurality of pixels, and the input may comprise one or more pixels selected automatically, as described above, or in conjunction with user input, in different embodiments. For example, in one embodiment, the user may select one or more pixels using any suitable user-interface facilities in an image editor 600 from among pixels automatically determined the be most likely skin pixels, as described above. The selection may comprise at least one of the most likely skin pixels and at least one location within the input image of the most likely skin pixels. As shown in 1320, a skin tone model 625 may be determined based on the automatically determined input and/or the user selection of the at least one likely skin pixel. In one embodiment, the skin tone model may comprise one or more truncated Gaussian functions. As shown in 1330, a skin tone mask 635 may be generated based on the skin tone model. The mask may comprise a respective value indicating a degree of membership in the mask for each of the plurality of pixels in the input image. The mask may be a soft mask, and the value indicating a degree of membership may be an intermediate value between a maximum and a minimum value in the mask. In one embodiment, the degree of membership in the mask is a function of a similarity in color to the selection and a proximity to the location of the selection. Thus, the skin tone model may be used to generate a location-weighted skin tone mask including a range of skin tone colors in the input image. The skin tone mask may be used to apply one of the image-editing operations 605 to desired portions of the input image 610.

As previously noted, a skin tone detector, as described herein, may be used in conjunction with various image processing operations to target or exclude skin pixels in those operations. One method for utilizing a skin tone detector with a seam carving operation is illustrated by the flow chart in FIG. 14. In this example, data representing an image to be resized is accessed, as in 1400. This data may be accessed in response to being imported into an application configured for image editing, or may be resident in memory accessible to such an application as a result of being imported previously, or as a result of being created and/or modified by the application prior to the desired resizing operation. Note that, as used herein, the term "image editing application" may refer to a graphic application that is specifically directed to image editing, or to any application that includes an image editing component, according to various embodiments. The data accessed may represent a whole image or a portion of an image that is to be resized, in different embodiments. For example, in one embodiment, a user may select a portion of an image on which to perform a resizing operation using a selecting tool or a cropping tool of an image editing application. The user may also select a target size, expansion/reduction target (e.g., a percentage increase or decrease in one or more dimensions) and/or target aspect ratio for a resizing operation using various user interface elements (e.g., pull-down menus, radio buttons, or alphanumeric input fields), in various embodiments.

In this example, an automated skin tone protection feature is invoked for use in the resizing operation, as in 1405. In some embodiments, this feature may be selected by a user through a user interface of the image editing application (e.g., by selecting a radio button or pull-down menu option). In other embodiments, this feature may be applied as an automatic or default feature of the image editing application. In still other embodiments, selecting a skin tone protection feature may include selecting one or more clusters of skin tones to be protected or excluded from protection (e.g., by choosing dark skin tones or light skin tones using radio buttons, a menu, or a slider bar of the user interface) and/or may include the specification of a color tolerance for skin tone protection, as described above. In this example, invocation of the automated skin tone feature may initiate the execution of program instructions to perform the methods described herein for creating an image-specific skin tone mask. Thus, an initial skin tone mask may be created using a general skin tone model, the initial skin tone mask may be refined to adjust for biases of the general skin tone model, and the initial skin tone mask may be modified using the color range selection methods described herein to generate an image-specific skin tone model that is applied to the input image to generate a skin tone mask of the image.

In this example, respective energy values may be determined for each of the pixels of image based, at least in part, on the skin tone mask. In this example, the method includes applying a weighting function to pixel values representing skin tones and/or non-skin tones, according to the skin tone mask, as in 1410. In other words, higher priority may be given to skin pixels and/or lower priority may be given to non-skin pixels. The energy values for all of the pixels of the input image may then be determined using a derivative function or another parametric function, or by any of various other methods (e.g., using a mapping function, look-up table, or other mechanisms) dependent on the weighting applied to the skin tone and/or non-skin pixels, as in 1420. In some embodiments, the energy values may be determined based on derived values of the weighted pixel colors (e.g., an average, maximum, sum or difference of the weighted values of a pixel and its neighbors).

Dependent on these energy values, the relative cost of various seams of the image may be determined, as in 1420. For example, in some embodiments, a cost may be computed for all possible seams of the image, or for the lowest possible seam for each edge pixel of the image, while in other embodiments, the data representing the image may be processed so that only a portion of the seams (e.g., the lowest-cost seams up to a given number or percentage of these seams) may be identified and their costs computed. Note that the cost of each seam may be determined in various ways in different embodiments, such as by calculating a sum, average, or weighted average of the energy values of the pixels making up the seam. In another example, the cost of each seam may be dependent on a maximum energy value for the pixels of the seam. In other words, a seam may be assigned a higher cost due to the presence of even one high-energy pixel in the seam, because removing that pixel may create an undesirable visual artifact.

Figure 14:
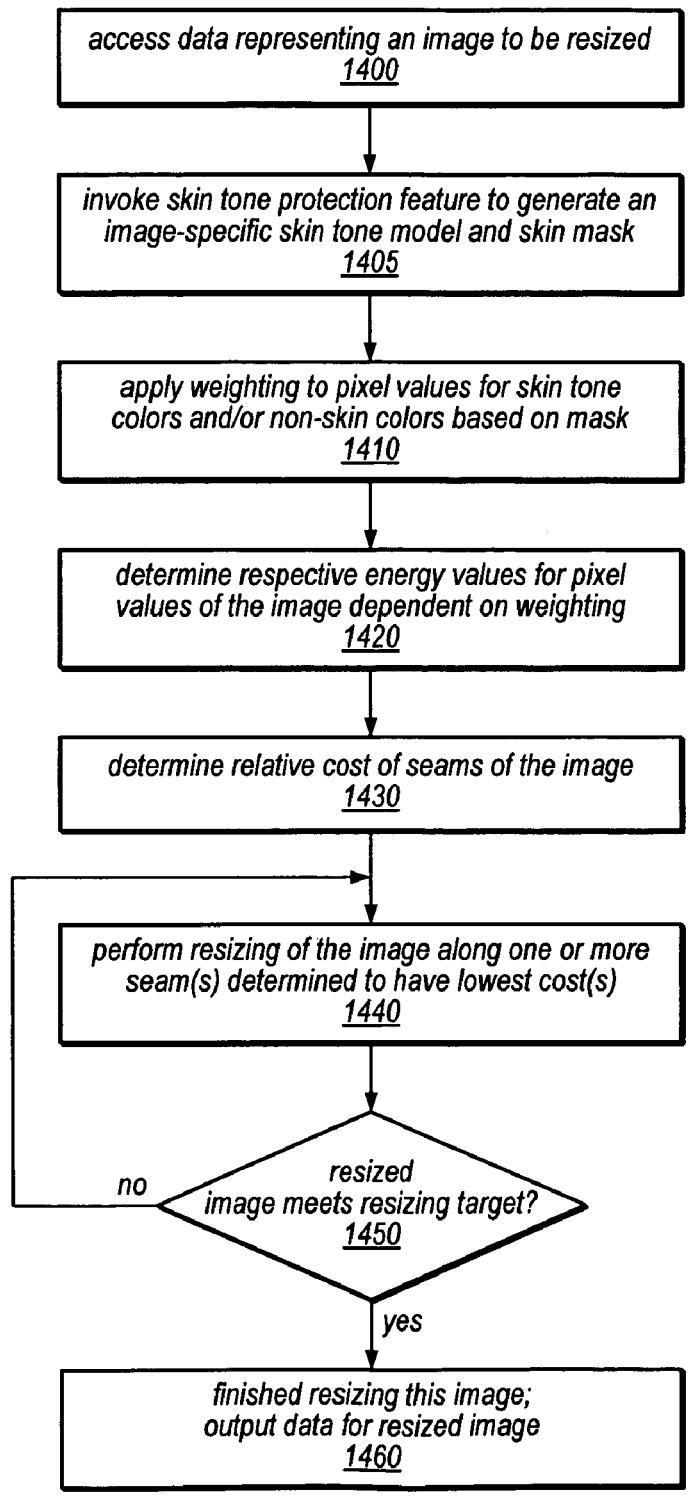
FIG. 14 is a flowchart illustrating a method for performing a seam carving operation utilizing an automated skin tone detector, according to one embodiment.

In the example illustrated in FIG. 14, the method may include resizing the image along one or more of the seams determined to have the lowest costs, as in 1430. As described above, if the image is to be reduced, the pixels of an identified low-cost seam (e.g., the lowest-cost seam) may be removed, while if the image is to be expanded, the pixels of an identified low-cost seam (e.g., the lowest-cost seam) may be replicated and inserted adjacent to the identified seam. Because skin pixels have been assigned a higher energy value than non-skin pixels, the seams containing these pixels will have higher costs than seams that do not include skin pixels. Thus, seams containing skin pixels may be protected from removal and/or expansion in the seam carving operation, in this example.

If the resizing operation performed in 1430 does not result in a resized image that meets its resizing target (e.g., a target for size, percentage increase/decrease, and/or aspect ratio), shown as the negative exit from 1440, additional resizing operations (e.g., on each successive next lowest cost seam) may be performed on the image. This is shown as the feedback from 1440 to 1430. If the resizing operation performed in 1430 results in a resized image that meets its resizing target, shown as the positive exit from 1440, the method may output data representing the resized image, as in 1450. For example, the data may be provided to a display component of the application for display of the resized image to the user and/or the data may be stored as in intermediate image by the image editing application for further processing by the application (or another application) or as a final image (e.g., written to main memory, a file, an archive, etc.). Note that the method illustrated in FIG. 14 may in various embodiments be applied to reduction of an image, expansion of an image, or a combination of reduction and expansion operations in order to resize the image to its target size and/or aspect ratio.

While several of the examples above involve the protection of skin tones, the method may be more generally applicable to protecting any given color or range/family of colors by adding bias to the energy function to assign a higher energy to the color or colors within a given delta of that color. For example, a user may choose to emphasize the blues or greens of an input image, in addition to protecting skin tones. In various embodiments, a mask may be created to bias the energy function, or a tool in the application may be used to select a portion of the image (e.g., an object or color) to identify pixels of a color that should be protected. For example, a quick selection tool or color selection tool may be used to specify one or more colors to be protected, or an image editing application may include an explicit "color range" command, in various embodiments. Similarly, a skin tone detection feature of a graphics application may be used in conjunction with region selection feature, e.g., to target or exclude skin pixels in a given region of an input image for an image processing operation (e.g., filtering, resizing, or feature identification). In general, a skin tone detection mechanism, as described herein, may be automatically invoked for a given image processing operation or may be selected or enabled by a user for one or more image processing operations of a graphics application, in different embodiments.

The methods described herein for automated skin tone detection and/or its use in conjunction with processing of images (e.g., within a graphics application) may be implemented by a computer system configured to provide the functionality described.

Figure 15:
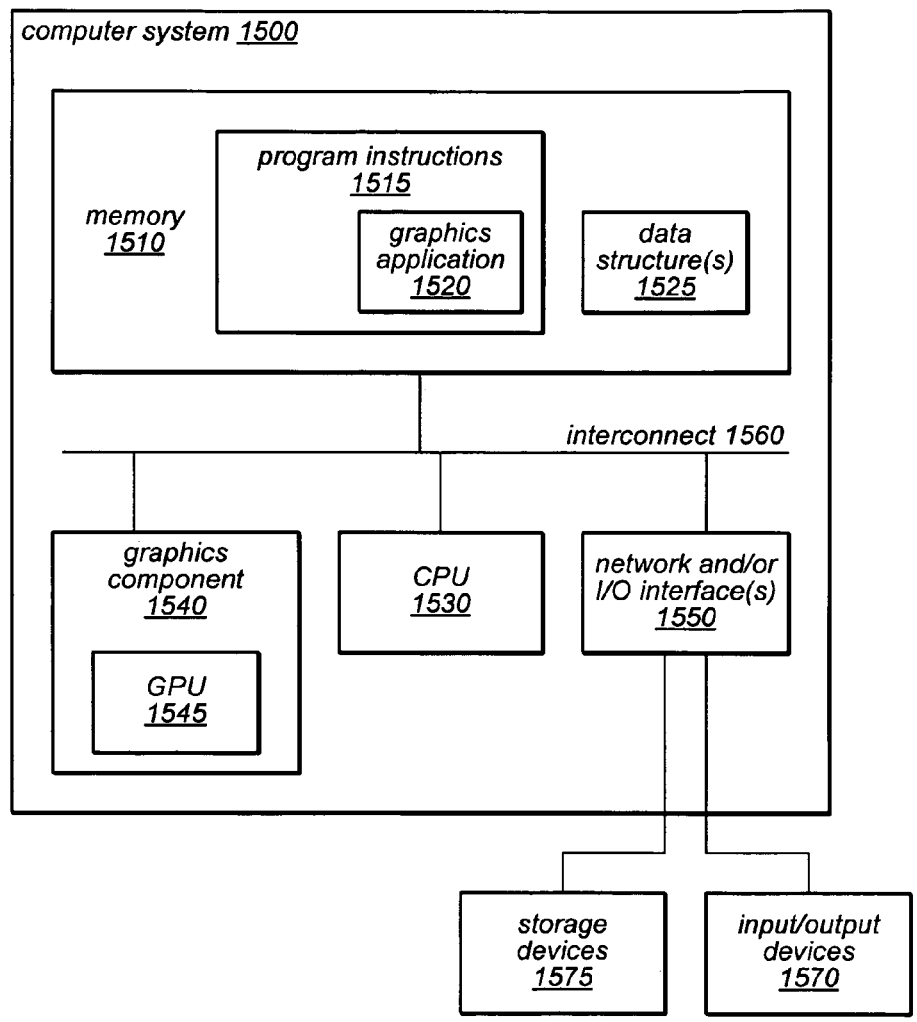
FIG. 15 is a block diagram illustrating constituent elements of a computer system that is configured to implement embodiments of the system and methods for automated skin tone detection.

FIG. 15 is a block diagram illustrating constituent elements of a computer system 1500 that is configured to implement embodiments of the systems and methods described herein, according to one embodiment. Computer system 1500 may be one of any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device. As illustrated in FIG. 15, computer system 1500 may in various embodiments include memory 1510, a graphics component 1540, one or more processor units (CPUs) 1530, and one or more network and/or input/output interfaces 1550. The illustrated components, including processor(s) 1530, system memory 1510, and others, may be coupled to each other by at least one communications bus, shown as interconnect 1560 (e.g., a system bus, LDT, PCI, ISA, or other communication bus type), and/or by interface 1550 (e.g., an ATM interface, an Ethernet interface, a Frame Relay interface, or other network interface). The CPU 1530, the interface 1550, and the memory 1510 may be coupled to the interconnect 1560. It should also be noted that one or more components of system 1500 might be located remotely and accessed via a network, in some embodiments.

Processors 1530 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1500, such as various versions of Unix, Linux, Windows® from Microsoft Corporation, MacOS® from Apple Corporation, or any other operating system that enables the operation of software on a hardware platform.

System memory 1510 may include one or more of cache, SRAM, DRAM, RDRAM, EDO RAM, DDR RAM, SDRAM, Rambus RAM, EEPROM, or other memory type), or other types of RAM or ROM. Memory 1510 may include other types of memory as well, or combinations thereof. One or more of memories 1510 may include program instructions 1515 executable by one or more of processors 1530 to implement aspects of the skin tone detection techniques and/or image processing operations described herein. Program instructions 1515, which may include program instructions configured to implement graphics application 1520, may be partly or fully resident within the memory 1510 of computer system 1500 at any point in time. Alternatively, program instructions 1515 may be provided to CPU 1530 and/or GPU 1545 for performing skin tone detection and/or image processing operations (or portions thereof) on CPU 1530 and/or GPU 1545 using one or more of the techniques described herein. In some embodiments, the techniques described herein may be implemented by a combination of program instructions 1515 executed on one or more processors 1530 and one or more GPUs 1545, respectively. Program instructions 1515 may also be stored on an external storage device 1575 accessible by the processor(s) 1530 and/or GPU 1545, in some embodiments. Any of a variety of such storage devices may be used to store the program instructions 1515 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1530 and/or GPU 1545 through one or more interfaces including, but not limited to, interconnect 1560 or interface 1550, as described herein. In some embodiments, the program instructions 1515 may be provided to the computer system 1500 via any suitable computer-readable storage medium including memory 1510 and/or external storage devices 1575 described above. Memory 1510 may also be configured to implement one or more data structures 1525, such as one or more data structures configured to store data representing one or more input images, output images, or intermediate images (e.g., during processing of the images). Data structures 1525 may be accessible by processor(s) 1530 and/or GPU 1545 when executing graphics application 1520 or other program instructions 1515.

A graphics application such as graphics application 1520 may be configured to perform automated skin tone detection on image data as part of various image processing functions and may render new images according to the functions performed. For example, graphics application 1520 may perform reductions and/or expansions of various images using seam carving techniques while protecting skin pixels of the input images, according to various embodiments. In another example, graphics application 1520 may perform identification of faces, people, and/or adult images in input images, and may perform highlighting, filtering, or blocking operations on the input images (e.g., to delete, cover, or otherwise distort adult content) to produce output images, in some embodiments. Graphics application 1520 may be configured to render output images to a separate window, or directly into the same frame buffer containing the corresponding input images, in different embodiments. Graphics application 1520 may represent various types of graphics applications, such as painting, publishing, photography, games, animation, and other applications. Additionally, graphics application 1520 may utilize graphics processor 1545 when processing, rendering, or displaying images according to various embodiments.

Graphics application 1520 may be provided as a computer program product, or software, that may include a computer-readable storage medium having stored thereon instructions, which may be used to program a computer system (or other electronic devices) to implement the skin tone detection methods and/or image processing operations described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As noted above, in some embodiments, memory 1510 may include program instructions 1515, comprising program instructions configured to implement graphics application 1520, as described herein. Graphics application 1520 may be implemented in various embodiments using any desired programming language, scripting language, or combination of programming languages and/or scripting languages, e.g., C, C++, C#, Java™, Perl, etc. For example, in one embodiment, graphics application 1520 may be JAVA based, while in another embodiments, it may be implemented using the C or C++ programming languages. In other embodiments, graphics application 1520 may be implemented using specific graphic languages specifically for developing programs executed by specialized graphics hardware, such as GPU 1545. In addition, graphics application 1520 may be embodied on memory specifically allocated for use by graphics processor(s) 1545, such as memory on a graphics component 1540 including graphics processor(s) 1545. Thus, memory 1510 may represent dedicated graphics memory as well as general-purpose system RAM, in various embodiments. Other information not described herein may be included in memory 1510 and may be used to implement the methods described herein and/or other functionality of computer system 1500.

Note that program instructions 1515 may be configured to implement an automated skin tone detector as a stand-alone application, or as a module of another graphics application or graphics library, in various embodiments. For example, in one embodiment program instructions 1515 may be configured to implement graphics applications such as painting, publishing, photography, games, animation, and/or other applications, and may be configured to detect skin pixels in images as part of one or more of these graphics applications. In another embodiment, program instructions 1515 may be configured to implement the skin tone detection techniques described herein in one or more functions called by another graphics application executed on GPU 1540 and/or processor(s) 1530. Program instructions 1515 may also be configured to render images and present them on one or more displays as the output of an image processing operation and/or to store image data for processed images in memory 1510 and/or an external storage device(s) 1575, in various embodiments. For example, a graphics application 1520 included in program instructions 1515 may utilize GPU 1540 when detecting skin tones, or when editing, rendering, or displaying images in some embodiments.

As illustrated in FIG. 15, a specialized graphics card or other graphics component 1540 may be coupled to the processor(s) 1530. The graphics component 1540 may include a graphics processing unit (GPU) 1545. Additionally, the computer system 1500 may include or be coupled to one or more imaging devices, such as input/output devices 1570. The one or more imaging devices may include various types of raster-based imaging devices such as monitors and printers. In one embodiment, one or more display devices may be coupled to the graphics component 1540 for display of data provided by the graphics component 1540 (not shown).

A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1540 may implement a number of graphics primitive operations in a way that makes executing them much faster than drawing directly to the screen with a host central processing unit (CPU), such as CPU 1530. In various embodiments, the methods described herein for detecting skin tones and/or processing an image may be implemented by program instructions configured for parallel execution on two or more such GPUs. The GPU 1545 may implement one or more application programmer interfaces (APIs) that permit programmers to invoke the functionality of the GPU. Suitable GPUs may be commercially available from vendors such as NVIDIA Corporation, ATI Technologies, and others. In some embodiments, graphics component 1540 may interface with the motherboard of computer system 1500 by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 15, memory 1510 may represent any of various types and arrangements of memory, including general-purpose system RAM and/or dedication graphics or video memory.

Interface 1550 may be configured to enable computer system 1500 to communicate with other computers, systems or machines, such as across a network. A network interface 1550 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1500 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1550 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 1500 may also include one or more additional I/O interfaces 1550, such as interfaces for one or more input/output devices 1570, or such devices may be coupled to computer system 1500 via a network interface 1550. For example, computer system 1500 may include interfaces to a keyboard, a mouse or other cursor control device, a joystick, or other user input devices 1570, in various embodiments. Additionally, the computer system 1500 may include one or more displays, coupled to processors 1530 and/or other components via interconnect 1560 or I/O interface 1550. Such input/output devices may be configured to allow a user to interact with graphics application 1520 to request various image processing operations and/or to specify various parameters, thresholds, and/or other configurable options available to the user when processing images by executing graphic application 1520. It will be apparent to those having ordinary skill in the art that computer system 1500 may also include numerous other elements not shown in FIG. 15.

While various skin detection techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. For example, in various embodiments, the elements shown in FIGS. 2, 5, and 10-14 may be performed in a different order than the illustrated order. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
accessing data representing an image comprising a plurality of pixels;
creating an initial skin tone mask for the image dependent on a general skin tone model, wherein the general skin tone model is based on a plurality of training samples, and wherein the initial skin tone mask comprises a respective value for each of the plurality of pixels indicating a probability that the pixel is a skin pixel;
applying an upper threshold to the initial skin tone mask to identify one or more of the plurality of pixels of the image most likely to be skin pixels;
applying a lower threshold to the initial skin tone mask to identify one or more pixels of the image least likely to be skin pixels;
producing an image-specific skin tone model dependent on the one or more pixels most likely to be skin pixels, and producing an image-specific non-skin model dependent on the one or more pixels least likely to be skin pixels; and
applying the image-specific skin tone model and the image-specific non-skin model to the image to generate a final skin tone mask for the image, wherein the final skin tone mask comprises a respective value indicating a degree of membership in the final skin tone mask for each of the plurality of pixels in the image, and wherein the degree of membership in the final skin tone mask is a function of a similarity in color to the one or more pixels most likely to be skin pixels and the one or more pixels least likely to be skin pixels.

2. The method of claim 1, further comprising:
performing an image editing operation on the image targeting one of skin pixels or non-skin pixels to produce a modified version of the image, wherein the skin pixels or non-skin pixels targeted are dependent on the final skin tone mask; and
rendering the modified version of the image to a display device.

3. The method of claim 2, wherein the image editing operation comprises one of: a filtering operation, a color correction operation, or a resizing operation.

4. The method of claim 1, further comprising:
performing an image editing operation on the image excluding one of skin pixels or non-skin pixels to produce a modified version of the image, wherein the skin pixels or non-skin pixels excluded are dependent on the final skin tone mask; and
rendering the modified version of the image to a display device.

5. The method of claim 4, wherein the image editing operation comprises one of: a filtering operation, a color correction operation, or a resizing operation.

6. The method of claim 1, further comprising:
performing an image identification operation identifying in the image one or more of: a face, a human being, or an adult image;
wherein said identifying is dependent on the final skin tone mask.

7. The method of claim 1, further comprising:
modifying the general skin tone model to compensate for an inherent color bias in the general skin tone model.

8. The method of claim 1, further comprising:
modifying the image-specific skin tone model to compensate for an inherent color bias in the general skin tone model.

9. The method of claim 1, wherein colors of at least two of the one or more pixels most likely to be skin pixels belong to different clusters of probable skin tone colors.

10. The method of claim 9, wherein said applying an upper threshold comprises applying different threshold values to the different clusters of probable skin tone colors.

11. The method of claim 1, further comprising:
receiving input specifying one of a plurality of clusters of probable skin tone colors;

wherein said applying an upper threshold comprises applying a respective threshold value dependent on the specified one of the plurality of clusters.

12. The method of claim 1, wherein said creating an initial skin tone mask, said applying an upper threshold, said producing an image-specific skin tone model, and said applying the image-specific skin tone model are performed in response to receiving input indicating that a skin detection mechanism should be applied in conjunction with an image processing operation on the image.

13. The method of claim 1, wherein the image-specific skin tone model comprises one or more truncated Gaussian functions.

14. The method as recited in claim 13, wherein each of the one or more truncated Gaussian functions is defined in a three-dimensional color space that separates luminance from chrominance.

15. The method of claim 13, further comprising:
receiving input comprising a color tolerance;
adjusting a color tolerance of at least one of the one or more truncated Gaussian functions dependent on the color tolerance; and
modifying the final skin tone mask in response to adjusting the color tolerance.

16. The method of claim 1,
wherein said producing an image-specific skin tone model and said producing an image-specific non-skin model dependent on comprise determining a skin tone cluster and a non-skin cluster, respectively;
wherein the skin tone cluster comprises colors of the one or more most likely skin pixels;
and wherein the non-skin cluster comprises colors of one or more least likely skin pixels.

17. The method of claim 16, wherein each of the skin tone cluster and the non-skin cluster comprises at least one truncated Gaussian function.

18. A non-transitory computer-readable storage medium, storing program instructions computer-executable to implement:
accessing data representing an image comprising a plurality of pixels;
creating an initial skin tone mask for the image dependent on a general skin tone model, wherein the general skin tone model is based on a plurality of training samples, and wherein the initial skin tone mask comprises a respective value for each of the plurality of pixels indicating a probability that the pixel is a skin pixel;
applying an upper threshold to the initial skin tone mask to identify one or more of the plurality of pixels of the image most likely to be skin pixels;
applying a lower threshold to the initial skin tone mask to identify one or more pixels of the image least likely to be skin pixels;
producing an image-specific skin tone model dependent on the one or more pixels most likely to be skin pixels, and producing an image-specific non-skin model dependent on the one or more pixels least likely to be skin pixels; and
applying the image-specific skin tone model and the image-specific non-skin model to the image to generate a final skin tone mask for the image, wherein the final skin tone mask comprises a respective value indicating a degree of membership in the final skin tone mask for each of the plurality of pixels in the image, and wherein the degree of membership in the final skin tone mask is a function of a similarity in color to the one or more pixels most likely to be skin pixels and the one or more pixels least likely to be skin pixels.

19. The storage medium of claim 18, wherein the program instructions are further executable to implement:
performing an image editing operation on the image targeting one of skin pixels or non-skin pixels to produce a modified version of the image, wherein the skin pixels or non-skin pixels targeted are dependent on the final skin tone mask; and
rendering the modified version of the image to a display device.

20. The storage medium of claim 18, wherein the program instructions are further executable to implement:
performing an image editing operation on the image excluding one of skin pixels or non-skin pixels to produce a modified version of the image, wherein the skin pixels or non-skin pixels excluded are dependent on the final skin tone mask; and
rendering the modified version of the image to a display device.

21. The storage medium of claim 18, wherein the program instructions are further executable to implement:
performing an image identification operation identifying in the image one or more of: a face, a human being, or an adult image;
wherein said identifying is dependent on the final skin tone mask.

22. The storage medium of claim 18, wherein the program instructions are further executable to implement:
modifying the general skin tone model or the image-specific skin tone model to compensate for an inherent color bias in the general skin tone model.

23. The storage medium of claim 18,
wherein colors of at least two of the one or more pixels most likely to be skin pixels belong to different clusters of probable skin tone colors; and
wherein said applying an upper threshold comprises applying different threshold values to the different clusters of probable skin tone colors.

24. The storage medium of claim 18, wherein the image-specific skin tone model comprises one or more truncated Gaussian functions defined in a three-dimensional color space that separates luminance from chrominance.

25. The storage medium of claim 18,
wherein said producing an image-specific skin tone model and said producing an image-specific non-skin model dependent on comprise determining a skin tone cluster and a non-skin cluster, respectively, each comprising at least one truncated Gaussian function;
wherein the skin tone cluster comprises colors of the one or more most likely skin pixels; and
wherein the non-skin cluster comprises colors of one or more least likely skin pixels.

26. A system, comprising:
at least one processor; and
a memory coupled to the at least one processor, wherein the memory stores program instructions executable by the at least one processor to implement:
accessing data representing an image comprising a plurality of pixels;
creating an initial skin tone mask for the image dependent on a general skin tone model, wherein the general skin tone model is based on a plurality of training samples, and wherein the initial skin tone mask comprises a respective value for each of the plurality of pixels indicating a probability that the pixel is a skin pixel;

applying an upper threshold to the initial skin tone mask to identify one or more of the plurality of pixels of the image most likely to be skin pixels;

applying a lower threshold to the initial skin tone mask to identify one or more pixels of the image least likely to be skin pixels;

producing an image-specific skin tone model dependent on the one or more pixels most likely to be skin pixels, and producing an image-specific non-skin model dependent on the one or more pixels least likely to be skin pixels; and applying the image-specific skin tone model and the image-specific non-skin model to the image to generate a final skin tone mask for the image, wherein the final skin tone mask comprises a respective value indicating a degree of membership in the final skin tone mask for each of the plurality of pixels in the image, and wherein the degree of membership in the final skin tone mask is a function of a similarity in color to the one or more pixels most likely to be skin pixels and the one or more pixels least likely to be skin pixels.

27. The system of claim 26, wherein the program instructions are further executable to implement:

performing an image editing operation on the image targeting one of skin pixels or non-skin pixels to produce a modified version of the image, wherein the skin pixels or non-skin pixels targeted are dependent on the final skin tone mask; and rendering the modified version of the image to a display device.

28. The system of claim 26, wherein the program instructions are further executable to implement:

performing an image editing operation on the image excluding one of skin pixels or non-skin pixels to produce a modified version of the image, wherein the skin pixels or non-skin pixels excluded are dependent on the final skin tone mask; and rendering the modified version of the image to a display device.

29. The system of claim 26, wherein the program instructions are further executable to implement:

performing an image identification operation identifying in the image one or more of: a face, a human being, or an adult image;

wherein said identifying is dependent on the final skin tone mask.

30. The system of claim 26, wherein the program instructions are further executable to implement:

modifying the general skin tone model or the image-specific skin tone model to compensate for an inherent color bias in the general skin tone model.

31. The system of claim 26, wherein colors of at least two of the one or more pixels most likely to be skin pixels belong to different clusters of probable skin tone colors; and wherein said applying an upper threshold comprises applying different threshold values to the different clusters of probable skin tone colors.

32. The system of claim 26, wherein the image-specific skin tone model comprises one or more truncated Gaussian functions defined in a three-dimensional color space that separates luminance from chrominance.

33. The system of claim 26, wherein said producing an image-specific skin tone model and said producing an image-specific non-skin model dependent on comprise determining a skin tone cluster and a non-skin cluster, respectively, each comprising at least one truncated Gaussian function;

wherein the skin tone cluster comprises colors of the one or more most likely skin pixels; and wherein the non-skin cluster comprises colors of one or more least likely skin pixels.

* * * * *

UNITED STATES PATENT AND TRADEMARK OFFICE
CERTIFICATE OF CORRECTION

PATENT NO. : 8,406,482 B1
APPLICATION NO. : 12/200476
DATED : March 26, 2013
INVENTOR(S) : Jen-Chan Chien Page 1 of 1

It is certified that error appears in the above-identified patent and that said Letters Patent is hereby corrected as shown below:

In the Claims

Column 25, Line 29, before "comprise determining...", delete "dependent on", therefor.

Column 26, Line 47, before "comprise determining...", delete "dependent on", therefor.

Column 28, Line 29, before "comprise determining...", delete "dependent on", therefor.

Signed and Sealed this
Eleventh Day of March, 2014

Michelle K. Lee
*Deputy Director of the United States Patent and Trademark Office*